United States Patent
Naruto et al.

(10) Patent No.: US 6,724,974 B2
(45) Date of Patent: Apr. 20, 2004

(54) IMAGE DATA MANAGEMENT SYSTEM

(75) Inventors: Hirokazu Naruto, Higashiosaka (JP); Masahito Niikawa, Sakai (JP)

(73) Assignee: Minolta Co., Ltd., Osada (JP)

( * ) Notice: Subject to any disclaimer, the term of this patent is extended or adjusted under 35 U.S.C. 154(b) by 0 days.

(21) Appl. No.: 09/340,130

(22) Filed: Jun. 28, 1999

(65) Prior Publication Data

US 2003/0012547 A1 Jan. 16, 2003

(30) Foreign Application Priority Data

Jul. 1, 1998 (JP) .......................... 10-186200

(51) Int. Cl.[7] ................................. H04N 5/91
(52) U.S. Cl. ........................... 386/46; 386/95
(58) Field of Search ................ 386/1, 46, 83, 386/117, 120, 95; 348/231, 232, 233, 907, 207.1; 358/906, 909.1; 707/203; 709/217, 225, 226

(56) References Cited

U.S. PATENT DOCUMENTS

| | | | |
|---|---|---|---|
| 4,706,121 A | * 11/1987 | Young | ......................... 386/83 |
| 5,819,235 A | 10/1998 | Tamai et al. | |
| 6,038,601 A | * 3/2000 | Lambert et al. | ............. 709/226 |
| 6,141,489 A | * 10/2000 | Honda | .......................... 386/95 |
| 6,173,271 B1 | * 1/2001 | Goodman et al. | ........... 348/907 |
| 6,192,191 B1 | * 2/2001 | Suga et al. | ................. 386/120 |
| 6,525,761 B2 | * 2/2003 | Sato et al. | ................ 348/207.1 |

FOREIGN PATENT DOCUMENTS

JP           10-143362         5/1998

* cited by examiner

*Primary Examiner*—Thai Tran
*Assistant Examiner*—Christopher Onuaku
(74) *Attorney, Agent, or Firm*—Sidley Austin Brown & Wood LLP

(57) ABSTRACT

An image data management device, that records image data captured by a digital camera together with information indicating the use period of the image data, searches for image files captured by the digital camera and checks the use period of the image data which has been found. When the use period of the image file has expired, the image data management device deletes the image file.

24 Claims, 4 Drawing Sheets

|  | INFORMATION | ATTRIBUTE | DIGIT | EXAMPLE OF DATA |
|---|---|---|---|---|
| Header | Header 1 Indicator | Fixed-length | 10 | 0123456789 |
| Header | Header 2 Image data size X | Fixed-length | 4 | 00FF |
| Header | Header 3 Image data size Y | Fixed-length | 4 | 00FF |
| Header | Header 4 Use period | Fixed-length | 8 | 19991231 |
| Data | Image data R | Variable-length | — | 00000005,····0000 |
| Data | Image data G | Variable-length | — | 00100245,····0000 |
| Data | Image data B | Variable-length | — | 0A0000E05,····0000 |

Fig. 2

IMAGE DATA MANAGEMENT SYSTEM

BACKGROUND OF THE INVENTION

1. Field of the Invention

The present invention relates to a technology for recording and managing image data.

2. Description of the Prior Art

Recently, digital cameras and image scanners have become popular as peripheral apparatuses for personal computers. This has enabled users to easily input image data to personal computers. Image data that have been input can be edited or displayed on the personal computer. Input image data can also be output to a printer or the like thereby to be printed.

Input image data is usually stored on a recording medium such as hard disk of the personal computer. Image data is generally large in file size compared to other types of data and, as a result, causes a burden on the storing capacity of the recording medium of the personal computer. Thus, it is necessary for the user to frequently check the available storing capacity of the recording medium such as the hard disk and, when the available storing capacity is insufficient, delete unnecessary data. As more users are expected to handle image data more frequently, it imposes increasing burden on the user to check the available storing capacity of the hard disk and delete unnecessary data.

SUMMARY OF THE INVENTION

An object of the present invention is, in order to solve the problem described above, to provide an image data management device, an image recording device, an image data managing method and a recording medium that reduce the burden of the user in managing image data.

The object described above is achieved by such a configuration as described below.

The image data management device, according to the present invention, comprises a receiver for receiving image data and information indicating a use period of the image data, a recorder for recording the image data and the information indicating the use period received by the receiver on a recording medium, a manager that monitors the use period of the image data recorded on the recording medium, and a processor that deletes image data which has expired the use period from the recording medium.

The image data management device, according to the present invention, comprises a setter for settling a use period of image data, a recorder for recording information indicating the use period set by the setter, along with the image data on a recording medium, a manager that monitors the use period of the image data recorded on the recording medium, and a processor that deletes image data which has expired the use period from the recording medium.

When the recording medium is a fixed recording medium, the image data management device carries out data managing operations on the image data recorded on the fixed recording medium. When the recording medium is a removable recording medium, on the other hand, data managing operations are not carried out on the image data recorded on the removable recording medium.

The image recording device, according to the present invention, comprises a setter for setting a use period for image data which have been captured and a recorder that records information indicating the use period set by the setter along with the image data on a recording medium.

According to the image data managing method of the present invention, the image data is recorded along with information indicating a use period on a recording medium, checks the use period of the image data recorded on the recording medium, and deletes image data that has expired the use period from the recording medium.

BRIEF DESCRIPTION OF THE DRAWINGS

In the following description, like parts are designated by like reference numbers throughout the several drawings.

FIG. 2 shows a file format of image data recorded by a digital camera.

DETAILED DESCRIPTION OF THE PREFERRED EMBODIMENT

Now a preferred embodiment of the image data management system according to the present invention will be described below with reference to the accompanying drawings.

In the image data management system of this embodiment, an image recording device records image data and information indicating the use period of the image data when recording an image. An image data management device receives image data and information indicating the use period from the image recording device and records the data on a recording medium. The image data management device monitors the use period of the image data recorded on the recording medium, and automatically deletes image data that have expired the use period. Thus, the problem of shortage in storing capacity of the recording medium due to unnecessary image data can be solved. The operation will be described in detail below.

Configuration of Image Data Management Device

Figure 1:
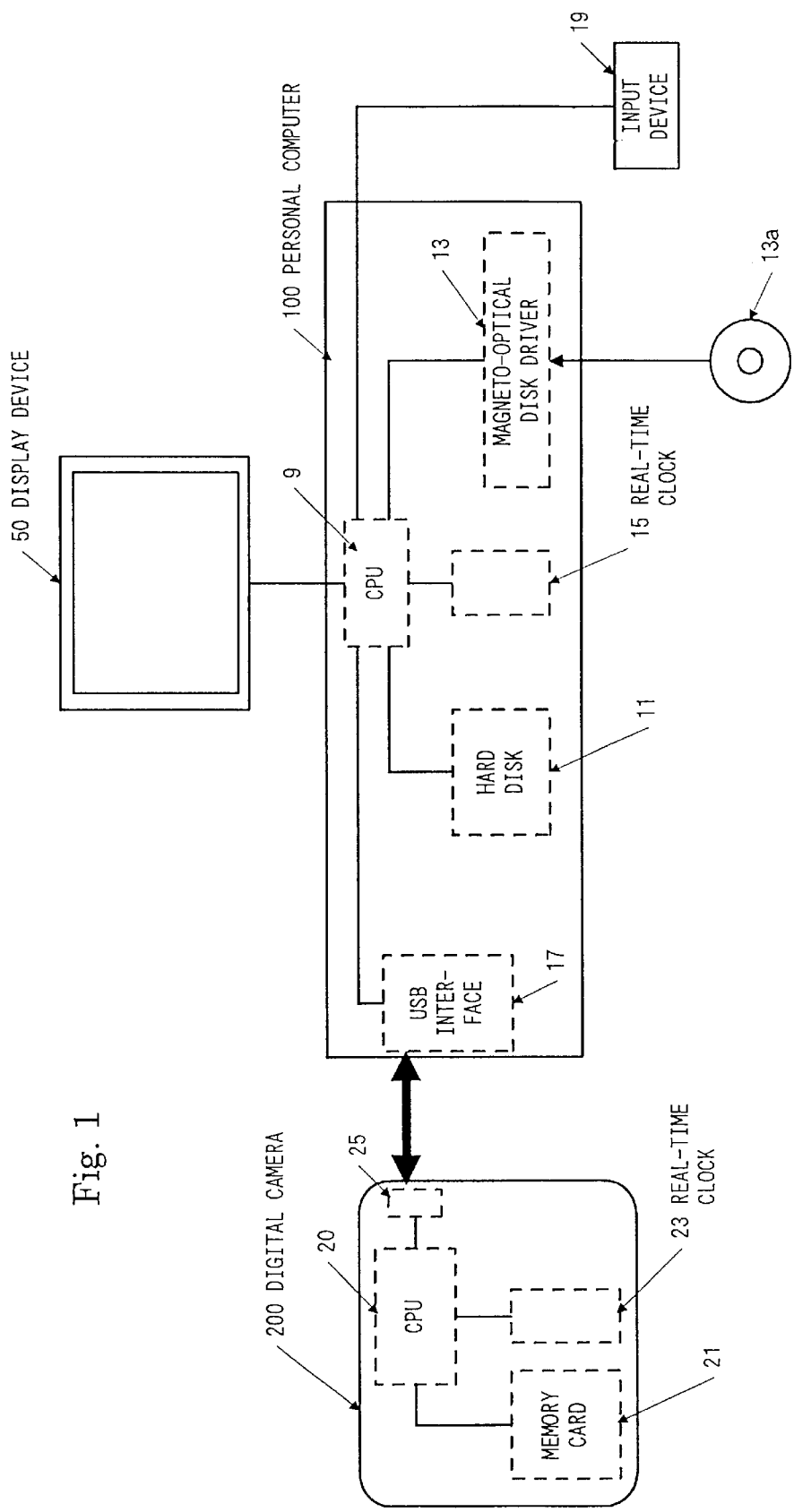
FIG. 1 shows the configuration of an image data management system according to the present invention.

FIG. 1 shows the configuration of an image data management system. The image data management system comprises an image data management device and a digital camera. The image data management device comprises a personal computer 100 provided with a CPU (central processing unit) 9. This personal computer 100 further has a hard disk 11 that is a fixed recording medium for storing data. The personal computer 100 is further provided with a magneto-optical disk drive 13 for writing/reading data on/from a magneto-optical disk 13a which is a removable information recording medium. The personal computer 100 is further provided with a real-time clock 15 that gives date and time information and a USB (Universal Serial Bus) interface 17 for exchanging data with external devices. The personal computer 100 is connected with input devices 19 such as a keyboard and a mouse and with a display device 50. The personal computer 100 may also be configured to be capable of writing/reading data on/from a CD-ROM, a floppy disk or other information recording medium, in addition to the magneto-optical disk 13a.

The image data management device achieves a function to be described later as the CPU 9 of the personal computer 100 executes a specified program stored in the hard disk 11 or the like. The specified program is provided on an information recording medium such as ROM (not shown) or a magneto-optical disk.

The digital camera 200 has a CPU 20 provided therein for controlling operations to achieve predetermined functions of the digital camera 200. The digital camera 200 is further provided with a memory card 21 that is a removable information recording medium, a real-time clock 23 that gives date and time information and a USB interface 25. The digital camera 200 records image data of a captured picture on the memory card 21 in the form of digital data.

In the image management system configured as described above, the image data management device is connected to the digital camera 200 via the USB interface 17. The image data management device retrieves the image data recorded on the memory card 21 of the digital camera 200 via the USB interface 25. The image data retrieved are stored on the hard disk 11 or the magneto-optical disk 13a.

Image Data Recording Format in Digital Camera

FIG. 2 shows a file format of the image data recorded on the memory card 21 by the digital camera 200. The image data are recorded on the memory card 21 in the form of an image file with a header added thereto including such information as the data size and the use period as show in FIG. 2. The header comprises header 1 through header 4. The header 1 includes an indicator recorded therein showing that the image data are recorded in the format shown in FIG. 2. The header 2 includes image data size X that is the number of pixels of the image data in X (horizontal) direction. The header 3 includes image data size Y that is the number of pixels of the image data in Y (vertical) direction. The header 4 includes the use period of the image data r recorded therein. The image data size is represented in hexadecimal notation. The use period is automatically set to a date one year after capturing the image by taking reference to the real-time clock 23) provided in the digital camera 200. The use period may also be set manually.

The image data comprises 8-bit tone data f or each of R, G and B colors. Image data R represents red color, image data G represents green color and image data B represents blue color. The image data have 2-digit data length (in hexadecimal notation) for one pixel, and total number of digits of the image data of each color is 2 X (image data size in X direction) X (image data size in Y direction).

Figure 3:
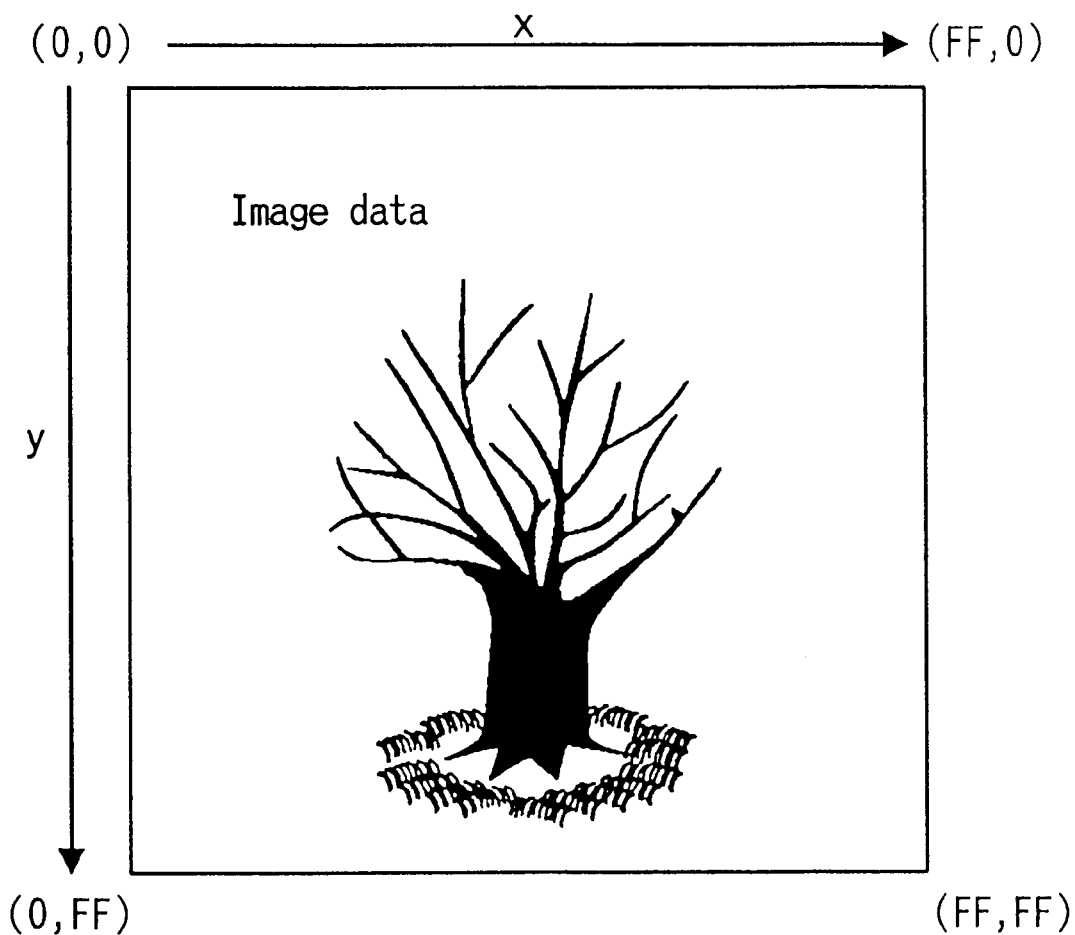
FIG. 3 shows an example of image data.

The example of data shown in FIG. 2 corresponds to the image data shown in FIG. 3. The image data shown in FIG. 3. The image data shown in FIG. 3 includes 256×256 (=65536) pixels, with each pixel having 8-bit tone data for each of R, G and B colors.

Operations of Image Data Management Device

In the image data managemen device, image data captured by the digital camera 200 are transferred in the format shown in FIG. 2 from the digital camera 200 via the USB interface 25. The transferred image data are stored as an image file of the format described above on the hard disk 11 or the magneto-optical disk 13a of the image data management device.

Figure 4:
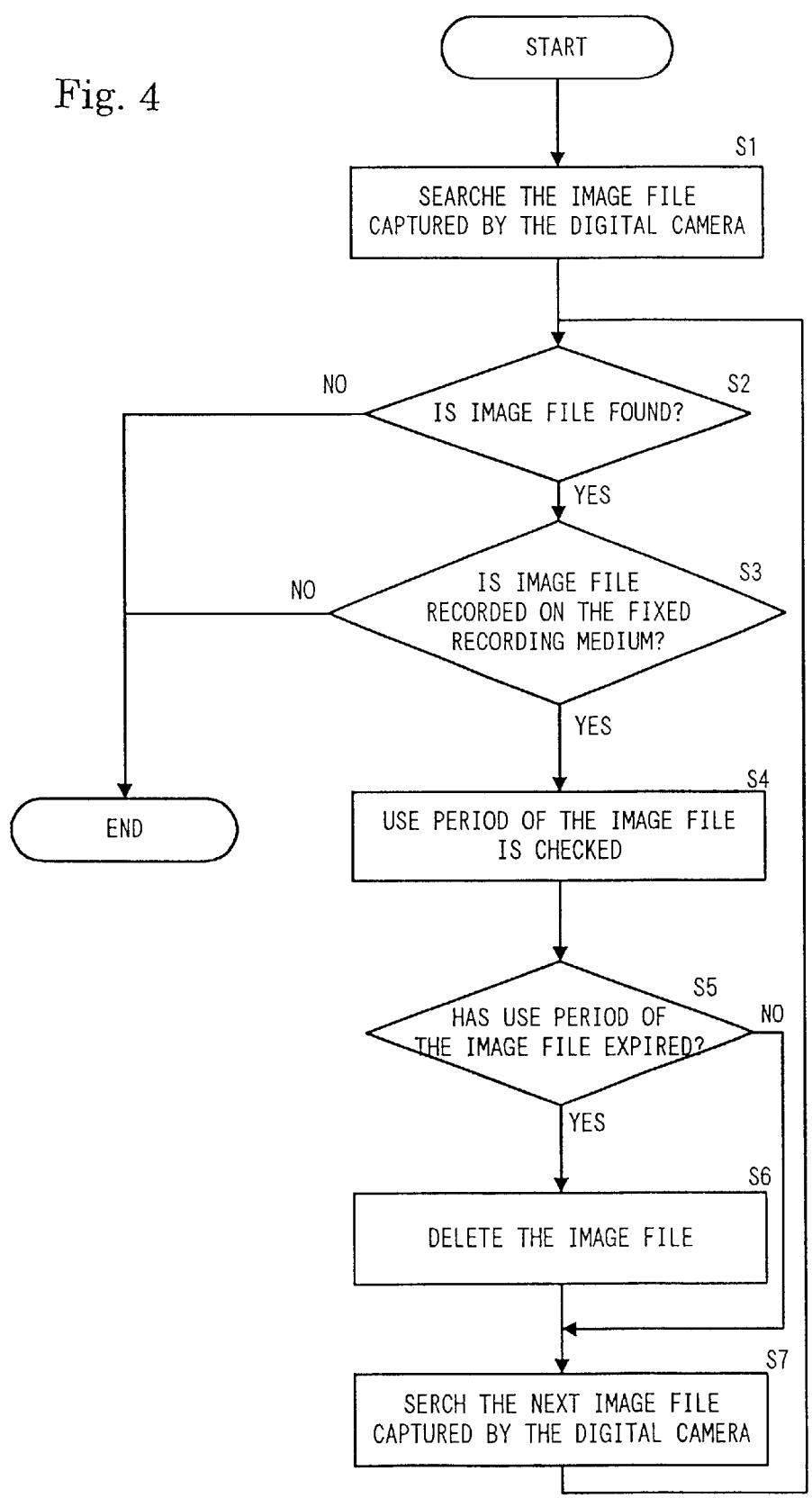
FIG. 4 is a flow chart indicating image data management operations of an image data management device.

The image data management device of this embodiment carries out the data managing operations shown in the flow chart of FIG. 4 when the device is operational. The operations will be described below.

The image data management device first searches for an image file captured by the digital camera 200 among image files stored on the hard disk 11 or the magneto-optical disk 13a (S1). In this search operation, the indicator of the header 1 is checked to decide whether the image file was recorded by the digital camera 200 or not. Upon judgment of the result of search (S2), when an image file captured by the digital camera 200 is not found, the data management process is terminated. In case an image file captured by the digital camera 200 is found, it is checked to see whether or not the image file is recorded on the fixed recording medium, namely the hard disk 11 (S3). When the image file is recorded on the hard disk 11, the use period of the image file is checked (S4). The use period of the image file and the current date are compared to decide whether use period of the image file has expired or not (S5). Current date is obtained from the real-time clock 15. When the use period of the image file has expired, the image file is deleted (S6). When the use period of the image file has not expired, step S6 is skipped. Then the next image file captured by the digital camera 200 is searched (S7) and the process returns to the step S2. Thereafter, the process from step S2 through S7 is repeated until all the image files captured by the digital camera 200 are found. The data management process may also be carried out at any time, not necessarily when the image data management device starts to operate. The use period of the image data may also be set by the user on the image data management device via the input device 19, so that the operations described above are carried out with reference to the use period which is thus set.

In such a procedure as described above, the image data management device searches for image files captured by the digital camera 200, checks the use periods of the image files and automatically deletes those of expired use period. At this time, the image data management device determines whether or not to carry out the data managing operations described above depending on the type of the information recording medium. Specifically, the image data management device carries out the operations only on data stored on the hard disk 11, not on image files recorded on information recording media other than the hard disk 11, such as the magneto-optical disk 13a or other removable information recording media. This makes it possible for the user to keep image files, which should not be automatically deleted, recorded on the magneto-optical disk 13a regardless of the use period.

Such a configuration may also be employed as search for the image files is carried out only on data stored on the hard disk 11.

As will be seen from the above description, the image data management device of this embodiment monitors the use periods of the image data recorded on the hard disk 11 and automatically deletes image data that have expired the use period. Accordingly, the user is relieved of tasks such as checking the available storing capacity of the hard disk 11, thus reducing the burden of data managing operations. Such a configuration may also be employed as the data managing operations are not carried out in case the recording medium for recording the image data is a removable recording medium. This makes it possible for the user to keep image files, which do not require managing operation based on the use period, recorded on the removable recording medium for a long period of time regardless of the use period.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image data management device comprising:
   a receiver for receiving image data and information indicating a use period of the image data;
   a recorder for recording onto a recording medium the image data and the information indicating the use period of the image data received by the receiver;
   a manager for monitoring the use period of the image data recorded onto the recording medium; and
   a processor for automatically deleting from the recording medium the image data once the manager detects that the image data has expired the use period.

2. An image data management device according to claim 1, wherein said recording medium is a fixed recording medium.

3. An image data management device according to claim 1, wherein said manager monitors the use period of image data captured by a digital camera among image data recorded on said recording medium.

4. An image data management device comprising:
   a setter for setting a use period of image data;
   a recorder for recording onto a recording medium information indicating the use period set by the setter along with the image data;
   a manager for monitoring the use period of the image data recorded onto the recording medium; and
   a processor for automatically deleting from the recording medium the image data once the manager detects that the image data has expired the use period.

5. An image data management device according to claim 4, wherein said recording medium is a fixed recording medium.

6. An image data management device according to claim 4, wherein said setter is manually operated.

7. An image data management device according to claim 4, wherein said manager monitors the use period of image data captured by a digital camera among image data recorded on said recording medium.

8. An image recording device comprising:
   a setter for setting a use period for image data which have been captured;
   a recorder for recording onto a recording medium information indicating the use period set by the setter along with the image data;
   a monitor for checking the use period of the image data to detect whether the image data have expired; and
   a processor for automatically deleting from the recording medium the image data once said image data are detected by the monitor to have expired based on the use period.

9. An image recording device according to claim 8, wherein said use period is set based on the captured date.

10. An image recording device according to claim 8, wherein an expiration time for image data is automatically set by the setter to a time one year after a capture time of said image data.

11. An image recording device according to claim 8, wherein said use period is manually set.

12. An image data management device according to claim 8, wherein said monitor checks the use period of image data captured by a digital camera among image data recorded on said recording medium.

13. A method for managing image data, comprising the steps of:
   recording onto a recording medium image data along with information indicating a use period;
   checking the use period of the image data recorded onto the recording medium; and
   automatically deleting from the recording medium the image data if, during the step of checking, the image data is detected to have expired the use period.

14. A method of managing image data in accordance with claim 13, wherein, in said step of checking, the use period of image data captured by a digital camera among image data recorded on said recording medium is checked.

15. A program product on a computer-readable medium executable by a computer, said program product comprising:
   instructions for recording onto a recording medium image data along with information indicating a use period;
   instructions for checking the use period of the image data recorded onto the recording medium; and
   instructions for automatically deleting from the recording medium the image data if, during the step of checking, the image data is detected to have expired the use period.

16. A program product in accordance with claim 15, wherein the use period of image data captured by a digital camera among image data recorded on said recording medium is checked.

17. A method of managing image data, comprising the steps of:
   searching a data storage area for each image file stored therein; and
   performing, for each image file found in said step of searching, the steps of:
      checking the contents of the image file for an indication of a certain file format that provides information representative of a use period for said image file;
      determining whether said use period has expired; and
      automatically deleting said image file if, in said step of determining, it is determined that said use period has expired.

18. A method of managing image data in accordance with claim 17, wherein, in said step of searching, each image file stored on a computer-readable medium is checked for header information indicative of a particular format.

19. A method of managing image data in accordance with claim 18, wherein each image file recorded by a digital camera among image files stored on said computer-readable medium is checked.

20. A method of managing image data in accordance with claim 17, wherein, in said step of determining, said use period is compared to a current date.

21. A method of managing image data in accordance with claim 17, further comprising the step of setting said use period for said image file.

22. A method of managing image data in accordance with claim 21, wherein said use period is automatically set based on a capture date of said image file.

23. A method of managing image data in accordance with claim 22, wherein said use period is one year from said capture date.

24. A method of managing image data in accordance with claim 21, wherein said use period is set by a user.

* * * * *

UNITED STATES PATENT AND TRADEMARK OFFICE
CERTIFICATE OF CORRECTION

PATENT NO. : 6,724,974 B2
DATED : April 20, 2004
INVENTOR(S) : Hirokazu Naruto et al.

It is certified that error appears in the above-identified patent and that said Letters Patent is hereby corrected as shown below:

Title page,
Item [73], Assignee, delete "Osada (JP)" and insert -- Osaka (JP) --.
Item [*] Notice, insert -- This patent issued on a continued prosecution application filed under 37 CFR 1.53(d), and is subject to the twenty year patent term provisions of 35 U.S.C. 1.54(a)(2) --.

Drawings,
Sheet 4, delete in its entirety and insert the following:

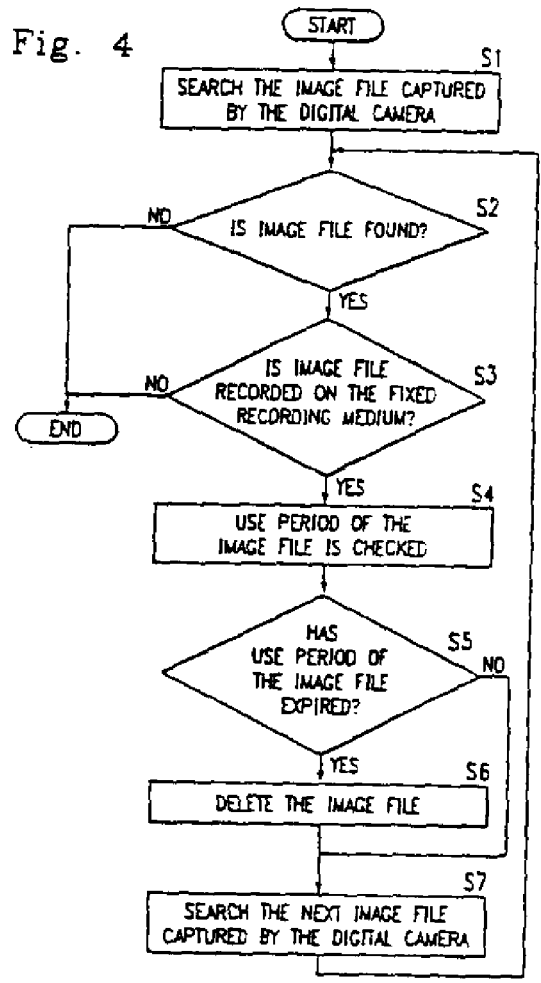

UNITED STATES PATENT AND TRADEMARK OFFICE
CERTIFICATE OF CORRECTION

PATENT NO.    : 6,724,974 B2
DATED         : April 20, 2004
INVENTOR(S)   : Hirokazu Naruto et al.

It is certified that error appears in the above-identified patent and that said Letters Patent is hereby corrected as shown below:

Column 1,
Line 2, insert -- [0001] This application is based on the application No. 10-186200 filed in Japan, the content of which is hereby incorporated by reference. --.
Line 49, delete "settling" and insert -- setting --.

Column 3,
Line 31, delete "data   r", and insert -- data --.
Line 35, after "23", delete ")".
Line 37, delete "f or", and insert -- for --.
Line 44 through 46, delete "the image data shown in FIG. 3. The image data shown in FIG. 3." and insert -- the image data shown in FIG. 3. --.
Line 51, delete "managemen", and insert -- management --.

Column 5,
Line 54, delete "date", and insert -- data --.

Signed and Sealed this

Twenty-eighth Day of September, 2004

JON W. DUDAS
*Director of the United States Patent and Trademark Office*